(12) United States Patent
Shirota

(10) Patent No.: US 6,361,223 B1
(45) Date of Patent: Mar. 26, 2002

(54) LENS BARREL

(75) Inventor: Kei Shirota, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/527,822

(22) Filed: Mar. 17, 2000

(30) Foreign Application Priority Data

Mar. 9, 1999 (JP) .............................. 11-085307

(51) Int. Cl.[7] .............................. G03B 17/04; G03B 5/02
(52) U.S. Cl. ..................................... 396/348; 396/349
(58) Field of Search ................................ 396/348, 349

(56) References Cited

U.S. PATENT DOCUMENTS 5,983,033 A * 11/1999 Yamazaki et al. ............. 396/85

FOREIGN PATENT DOCUMENTS

JP        11-72682        3/1999

* cited by examiner

*Primary Examiner*—David M. Gray
*Assistant Examiner*—Rochelle Blackman
(74) *Attorney, Agent, or Firm*—Sughrue Mion, PLLC

(57) ABSTRACT

In a lens barrel of a fixed-focus type, a guide section of a back moving frame for holding a lens back group is disposed at the middle between two guide sections provided on a front moving frame for holding a lens front group. A guide shaft is inserted into guide holes of those guide sections. A compression spring is disposed between one of the two guide sections provided on the front moving frame and the guide section of the back moving frame. A front moving frame and a back moving frame are moved together in an optical axis. At the time of a collapse, the compression spring is further compressed.

4 Claims, 4 Drawing Sheets

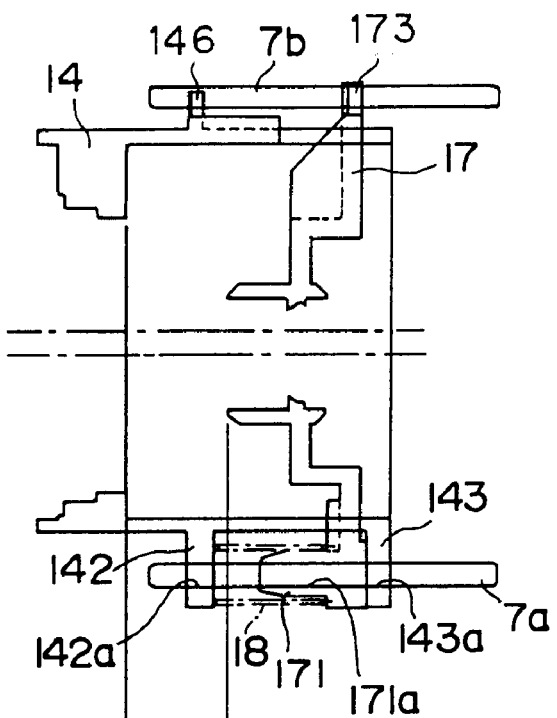
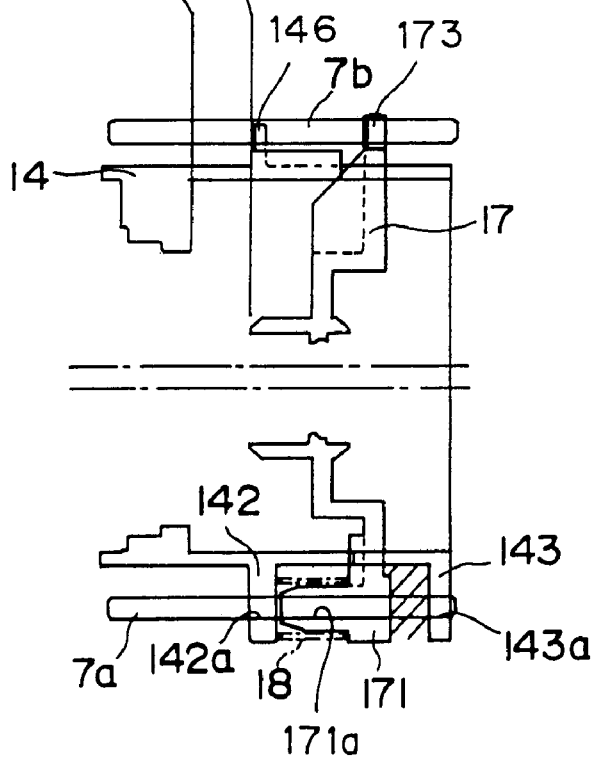

LENS BARREL

BACKGROUND OF THE INVENTION

1. Field of the Invention

The present invention relates to a lens barrel of a fixed-focus type of lens barrel.

2. Description of the Related Art

Hitherto, there are adopted various types of lens barrels in a camera and an electronic camera for instance, one of which is a fixed-focus type of lens barrel.

Recently, a thin type of camera or electronic camera is required. Adoption of a collapsible mount type of lens barrel may implement thinning of those cameras to some extent even for a fixed-focus type. However, further thinning of those cameras is required. In the body of those cameras, various members and mechanisms are disposed closely in such a manner that wasted spaces are almost eliminated. In order to implement more miniaturization of those cameras, it so happens that it is required that a shutter is disposed inside a lens barrel. In this case, simply, a size of the lens barrel in an optical axis is enlarged. And thus it is considered that even if a collapsible mount type of lens barrel is adopted, it is difficult to satisfy a requirement for thinning of those cameras in its entirety including the body.

SUMMARY OF THE INVENTION

In view of the foregoing, it is an object of the present invention to provide a fixed-focus type of lens barrel, and more particularly a lens barrel adapted to contributing to thinning a camera or electronic camera or the like adopting such a type of lens barrel.

To achieve the above-mentioned objects, the present invention provides a first lens barrel comprising: a main body frame; a first moving frame holding a first lens group and moving in an optical axis direction with respect to the main body frame; and a second moving frame holding a second lens group, which constitutes a fixed-focus lens in combination with the first lens group, and moving in the optical axis direction with respect to the main body frame, in which said first and second moving frames are moved by a single motor in the optical axis direction so as to provide collapse and extension with respect to said main body frame, wherein in an extension state of said lens barrel, said first and second moving frames move in one united body in the optical axis direction while keeping a predetermined interval therebetween, and in a transitional process from the extension state to a collapse state, a mutual interval between said first and second moving frames is narrowed.

According to the lens barrel of the present invention as mentioned above, it is possible to reduce a length of the lens barrel in the optical axis direction at the time of a collapse, and thereby thinning a camera and an electronic camera adopting the lens barrel of the present invention.

To achieve the above-mentioned objects, the present invention provides a second lens barrel comprising: a main body frame; a first moving frame holding a first lens group and moving in an optical axis direction with respect to the main body frame; and a second moving frame holding a second lens group, which constitutes a fixed-focus lens in combination with the first lens group, and moving in the optical axis direction with respect to the main body frame, in which said first and second moving frames are moved by a single motor in the optical axis direction with respect to said main body frame, said lens barrel further comprising:

a guide shaft for guiding a movement of both said first and second moving frames in the optical axis direction, said guide shaft being fixed on said main body frame and being extended in the optical axis direction, wherein said first moving frame has two first guide sections in which a movement in the optical axis direction is guided by said guide shaft, said two first guide sections being disposed at a predetermined interval therebetween in the optical axis direction, and said second moving frame has a second guide section in which a movement in the optical axis direction is guided by said guide shaft, said second guide section being disposed between said two first guide sections.

According to the second lens barrel of the present invention, the first moving frame has the two first guide sections, and the second guide section of the second moving frame is disposed between the two first guide sections. Consequently, when one of the moving frames is moved by a motor, another moving frame is also moved. That is, the first and second guide sections serve as not only a guide of a movement in the optical axis direction, but also a mechanism for performing coordinated movements of the two moving frames. Thus, such a simple mechanism makes it possible to implement coordinated movements of the two moving frames, and thereby contributing to a miniaturization of the lens barrel.

In the second lens barrel according to the present invention as mentioned above, it is preferable that between one of said two first guide sections and said second guide section, a spring member for enabling those guide sections are disposed. The use of the spring member makes it possible to surely maintain the two moving frames at predetermined relative positions in the use state.

Further, in the second lens barrel according to the present invention as mentioned above, it is preferable that said first and second moving frames are moved so as to provide collapse and extension with respect to said main body frame, and at the time of the extension, said first and second moving frames move in one united body in the optical axis direction while keeping a predetermined interval therebetween by an enabling force of said spring member, and at the time of the collapse, said first and second moving frames are maintained in a state that a mutual interval between said first and second moving frames is narrowed against the enabling force of said spring member.

This feature makes it possible to more reduce a length of the lens barrel in the optical axis direction at the time of a collapse, and thereby thinning a camera and an electronic camera adopting the lens barrel of the present invention.

BRIEF DESCRIPTION OF THE DRAWINGS

FIGS. 3(A) and 3(B) are each a sectional view of only a part of member of the lens barrel shown in FIG. 1 in an optical axis direction.

DETAILED DESCRIPTION OF PREFERRED EMBODIMENTS

Embodiments of the present invention will be described with reference to the accompanying drawings.

Figure 1:
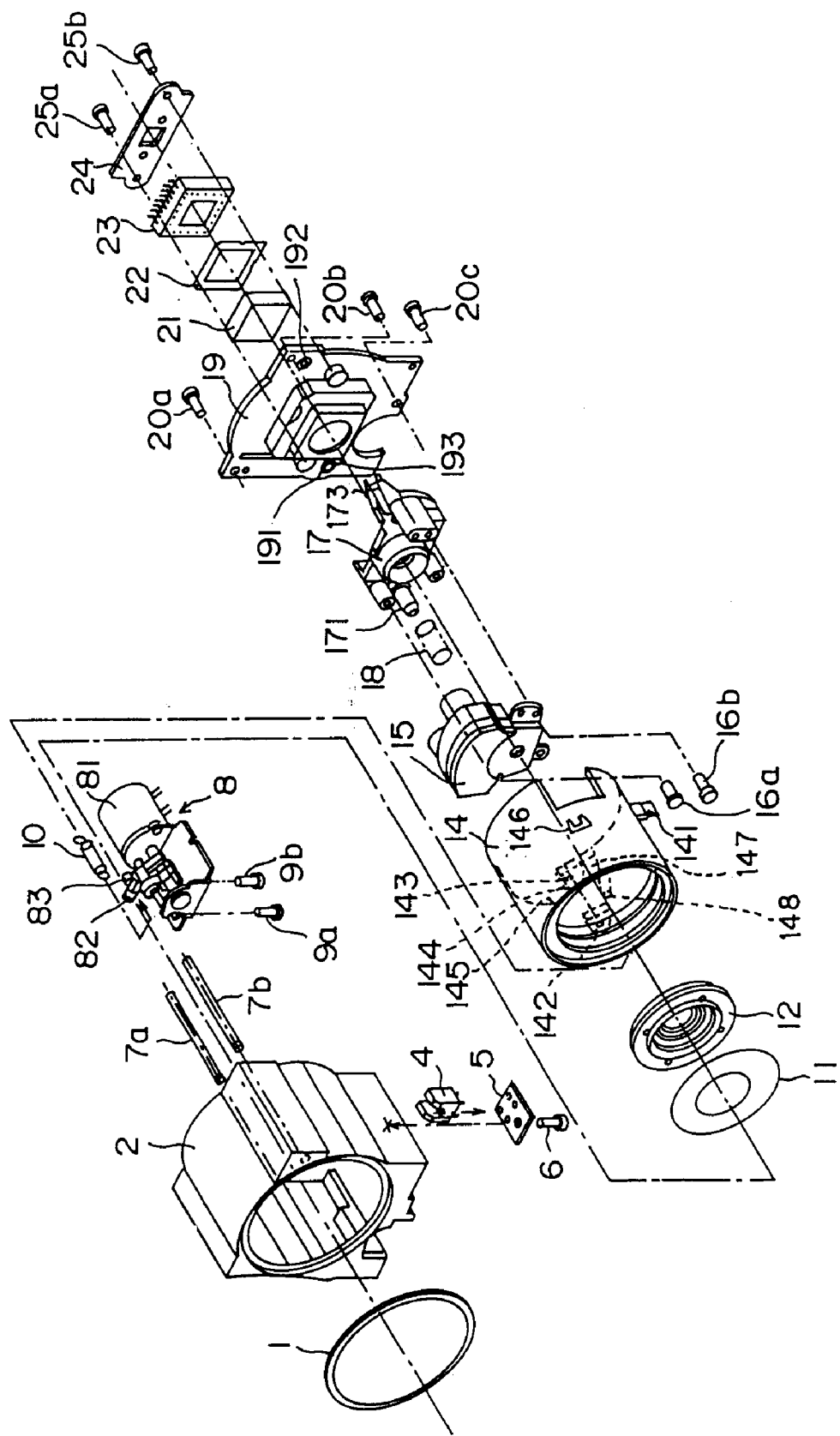
FIG. 1 is an exploded perspective view of a lens barrel according to an embodiment of the present invention.
Figure 2A:
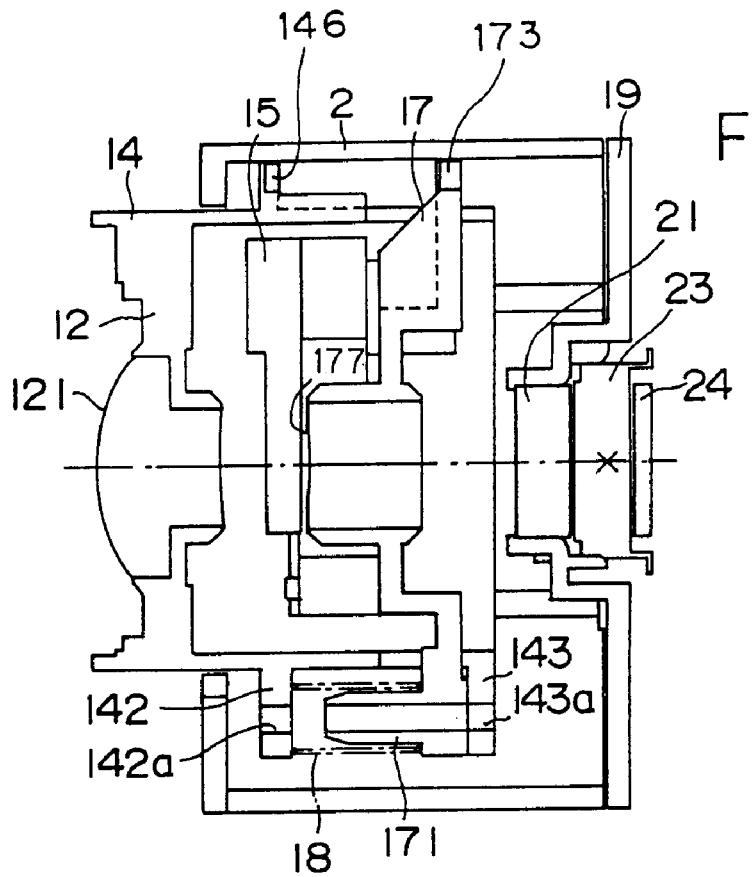
FIGS. 2(A) and 2(B) are each a sectional view of the lens barrel shown in FIG. 1 in an optical axis direction.
Figure 2B:
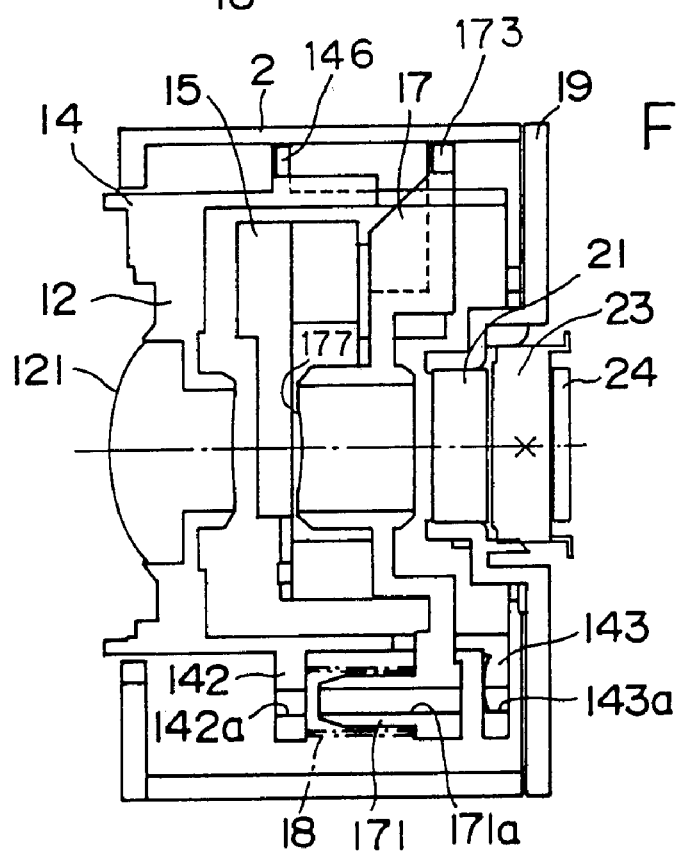

FIG. 1 is an exploded perspective view of a lens barrel according to an embodiment of the present invention. FIGS. 2(A) and 2(B) are each a sectional view of the lens barrel shown in FIG. 1 in an optical axis direction. FIG. 2(A) shows a state that the lens barrel is extended, and FIG. 2(B) shows a state that the lens barrel is collapsed. In order to avoid troublesomeness, in FIGS. 2(A) and 2(B), some of various sorts of members shown in FIG. 1 are omitted.

Figure 4:
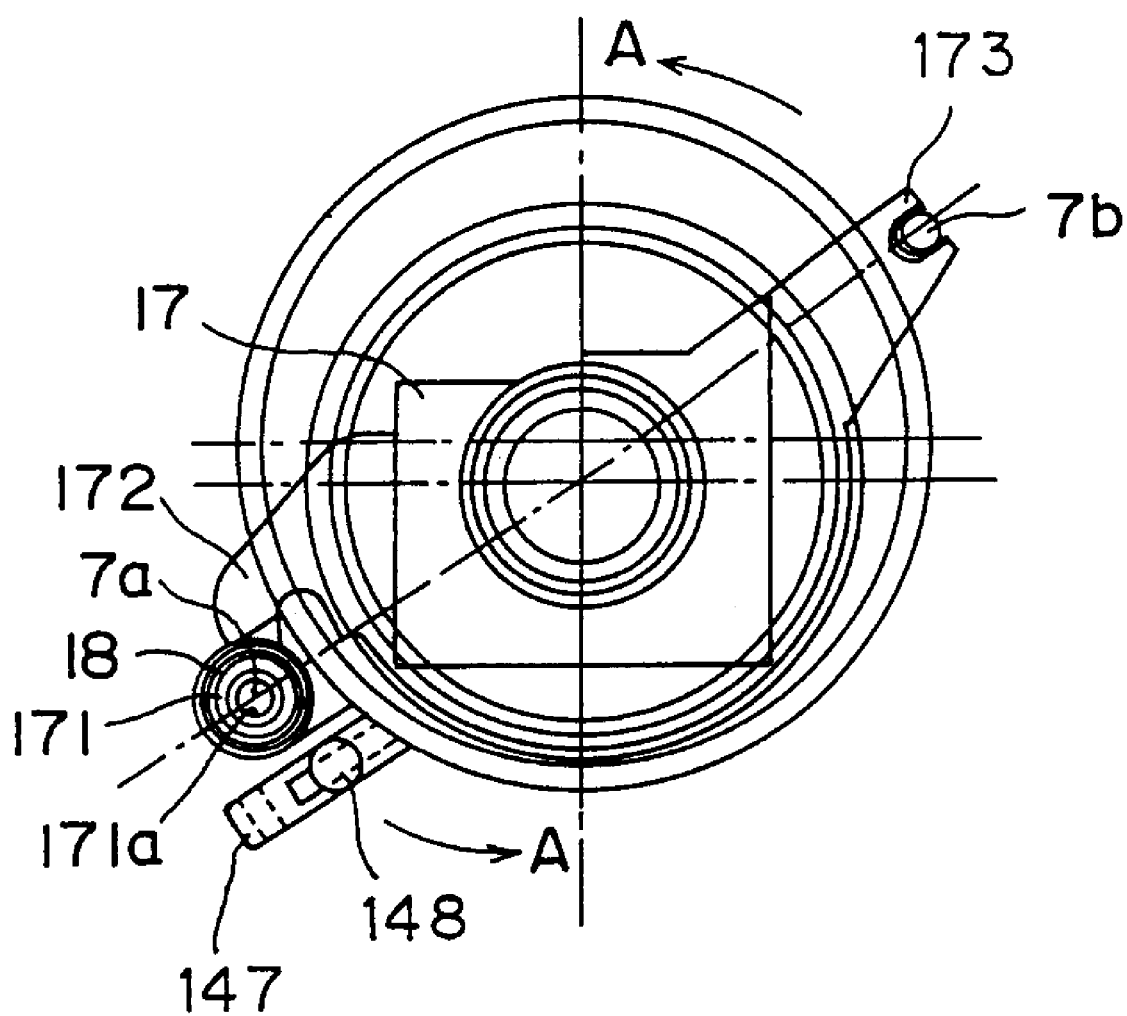
FIG. 4 is a typical illustration of the member shown in FIGS. 3(A) and 3(B) in an arranged state looking from the optical axis direction.

FIGS. 3(A) and 3(B) are each a sectional view of only a part of the member of the lens barrel shown in FIG. 1 in an optical axis direction so that characteristic portions of the present invention can be more clearly shown. FIG. 3(A) shows a state that the lens barrel is extended, and FIG. 3(3) shows a state that the lens barrel is collapsed. FIG. 4 is a typical illustration of the member shown in FIGS. 3(A) and 3(B) in an arranged state looking from the optical axis direction.

Hereinafter, there will be described a structure of a lens barrel according to an embodiment of the present invention referring to FIG. 1 and other figures as well, as a need arises.

As shown in FIG. 1, in front of a main frame 2, a ring-like shaped dust proof sheet 1 is bonded by a double coated tape (not illustrated). Inside the main frame 2, a front moving frame 14, which will be described later, is disposed so as to be extended and collapsed with respect to the main frame 2. The dust proof sheet 1 is in contact with a peripheral surface of the front moving frame 14 so that the dust is prevented from entering the inside of the lens barrel.

Below the main frame 2, a photo-interrupter 4 fixed on a substrate 5 is fixed by a machine screw 6. The photo-interrupter 4 detects a detection segment 141 projecting below the front moving frame 14. When the front moving frame 14 collapses by the maximum extent with respect to the main frame 2, the detection segment 141 is detected by the photo-interrupter 4 so that a motor 81 of a motor unit 8, which will be described later, is stopped.

Further, two guide shafts 7a and 7b extending in the optical axis direction are inserted into the main frame 2 and fixed thereon. Those two guide shafts 7a and 7b guide a movement of the front moving frame 14 and a back moving frame 17 in the optical axis direction. The guide shaft 7a, which is one of those two guide shafts 7a and 7b, is inserted, as shown in FIGS. 3(A) and 3(B), into guide holes 142a and 143a which are provided on guide sections 142 and 143, respectively. Those two guide sections 142 and 143 are located at positions which are mutually spaced by a predetermined distance in the optical axis direction. The two guide sections 142 and 143 correspond to an example of a first guide section referred to in the present invention.

At the intermediate section of those two guide sections 142 and 143, a guide section 171 shaped as a cylinder on a back moving frame 17, which will be described later, is disposed. The guide section 171 corresponds to an example of a second guide section referred to in the present invention. The guide section 171 of the back moving frame 17 is also provided with a guide hole 171a. The guide shaft 7a is also inserted into the guide hole 171a. Further, the guide shaft 7a is also inserted into a guide hole 191 provided on a base 19 which will be described later. A compression spring 18 is disposed between the guide section 142, which is one of the two guide sections 142 and 143 of the front moving frame 14, and the guide section 171 of the back moving frame 17. The compression spring 18 enables both the guide sections 142 and 171 to keep a mutual positional relation between the front moving frame 14 and the back moving frame 17. As shown in FIG. 4, the guide section 171 of the back moving frame 17 is provided on the top of a curved arm 172. The reason why the guide section 171 of the back moving frame 17 is provided on the top of the curved arm 172 is that the main body portion of the back moving frame 17 is disposed inside the front moving frame 14, and the guide section 171 of the back moving frame 17 is disposed at the middle between the two guide sections 142 and 143 projecting from the outer wall of the front moving frame 14 through bridging or bypassing a thickness portion (cf. FIG. 1) of the front moving frame 14 by the curved arm 172. Consequently, when the back moving frame 17 is assembled into the front moving frame 14, the back moving frame 17 is disposed within the front moving frame 14 through slightly shifting in a rotary direction from a normal position in the rotary direction on the optical axis in such a manner that the guide section 171 of the back moving frame 17 is located at a cut-out portion 145 (cf. FIG. 1) in which thickness of the front moving frame 14 is cut out, and thereafter the back moving frame 17 is slightly rotated in an arrow A of direction shown in FIG. 4. Thus, the guide section 171 of the back moving frame 17 is disposed at the middle between the two guide sections 142 and 143 of the front moving frame 14. This arrangement makes it possible to assemble the front moving frame 14 and the back moving frame 17.

The guide shaft 7b, which is one of the two guide shafts 7a and 7b, is engaged with a guide section 146 of the front moving frame 14, and further engaged with a guide section 173 of the back moving frame 17, and inserted into a guide section 192 of the base 19. When the motor 81 rotates, the front moving frame 14 and the back moving frame 17 move in the optical axis direction through a guidance by the two guide shafts 7a and 7b. In the movement, the front moving frame 14 and the back moving frame 17 move in a state that a relative position between the front moving frame 14 and the back moving frame 17 is kept by an effect of the compression spring 18. However, in the final step of the collapse, the back moving frame 17 comes up against a projection 193 (cf. FIG. 1) provided on the base 19 so that the back moving frame 17 cannot move any farther in the collapse direction. On the other hand, the front moving frame 14 moves against the enabling force of the compression spring 18 in the collapse direction until the photo-interrupter 4 detects the detection segment 141, and as shown in FIG. 2(B) and FIG. 3(B) stops in a state that the compression spring 18 is further compressed. This feature makes it possible to further reduce a thickness of the lens barrel in the optical axis at the time of the collapse.

Again referring to FIG. 1, there will be described the structure of the lens barrel.

The motor unit 8 is fixed on the bottom of the main frame 2 by machine screws 9a and 9b.

The motor unit 8 is provided with a spring stopper 82. One end of a tension spring 10 is hooked on the spring stopper 82.

Another end of the tension spring 10 is hooked on a spring stopper 147 of the front moving frame 14. The motor unit 8 is provided with a contact member 83. On the other hand, the front moving frame 14 is also provided with a contact member 148. Both the contact members 83 and 148 are kept in a state that they are in contact with one another by an effect of the tension spring 10. The motor unit 8 is so arranged that the spring stopper 82 and the contact member 83 of the motor unit 8 move in the optical axis direction in accordance with a rotation of the motor 81, so that when the motor 81 rotates, the front moving frame 14 is driven in the optical axis direction. When the front moving frame 14 moves in the optical axis direction, the back moving frame 17 is driven in the optical axis direction in accordance with an interaction between the two guide sections 142 and 143 of the front moving frame 14 and the guide section 171 of the back moving frame 17, and an effect of the compression spring 18.

In this manner, the two guide sections 142 and 143 of the front moving frame 14 and the guide section 171 of the back moving frame 17 have functions of not only a guidance in movement in the optical axis direction, but also an effect of coordinated movements of the front moving frame 14 and the back moving frame 17. Thus, there is no need to provide additionally a member for performing such coordinated movements and thereby contributing to miniaturization of the lens barrel.

Here, as mentioned above, at the time of the collapse, even after the back moving frame 17 comes up against a projection 193 provided on the base 19 so that the back moving frame 17 cannot move moreover in the collapse direction, the front moving frame 14 continues to move in the collapse direction, and stops in a state that the compression spring 18 is further compressed by an effect of the photo-interrupter 4 and the detection segment 141 of the front moving frame 14. This feature makes it possible to contribute to further thinning the lens barrel at the time of collapse.

A lens front group 121 (cf. FIGS. 2(A) and 2(B)) is held by a front lens frame 12 shown in FIG. 1. A decorative sheet 11 is adhered in front of the front lens frame 12. The front lens frame 12, on which the decorative sheet 11 is adhered, is fixed on the front moving frame 14.

A lens back group 177 (cf. FIGS. 2(A) and 2(B)) is held by the back moving frame 17. A shutter unit 15 is fixed by machine screws 16a and 16b in front of the back moving frame 17. The back moving frame 17, on which the shutter unit 15 is fixed, is assembled into the front moving frame 14 in such a manner that the guide section 171 of the back moving frame 17 is disposed between the two guide sections 142 and 143 of the front moving frame 14, and the compression spring 18 is disposed between the guide section 142, which is one of the two guide sections 142 and 143 of the front moving frame 14, and the guide section 171 of the back moving frame 17.

When the back moving frame 17 is assembled into the front moving frame 14, as mentioned above, the main frame portion of the back moving frame 17 is disposed within the front moving frame 14 through slightly shifting in a rotary direction from a normal position in the rotary direction on the optical axis, and then the back moving frame 17 is slightly rotated so as to be assembled in a normal state.

The base 19 is fixed at the back of the main frame 2 by three machine screws 20a, 20b and 20c. In this manner, an assembly of the front moving frame 14 and the back moving frame 17 is established inside the main frame 2 so that extension and collapse of the lens barrel are performed by a rotation of the motor 81.

The present embodiment relates to a lens barrel for an electronic camera in which at the backward portion of a base 20 there are disposed an optical low-pass filter 21, a low-pass filter holding rubber 22 for holding the optical low-pass filter 21, a CCD 23 for receiving images, and a CCD reference plate 24 in the named order, and those elements are fixed on the base 19 by machine screws 25a and 25b.

While the present embodiment relates to an example in which a lens barrel of the present invention is applied to an electronic camera, the lens barrel of the present invention is applicable to not only the electronic camera, but also the conventional type of camera in which a photography is performed on a photographic film, and another type of camera such as a video camera.

As mentioned above, according to the present invention, it is possible to provide a miniaturized and thinned lens barrel.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A lens barrel comprising: a main body frame; a first moving frame holding a first lens group and moving in an optical axis direction with respect to the main body frame; and a second moving frame holding a second lens group, which constitutes a fixed-focus lens in combination with the first lens group, and moving in the optical axis direction with respect to the main body frame, in which said first and second moving frames are moved by a single motor in the optical axis direction so as to provide collapse and extension with respect to said main body frame, wherein in an extension state of said lens barrel, said first and second moving frames move in one united body in the optical axis direction while keeping a predetermined interval therebetween, and in a transitional process from the extension state to a collapse state, a mutual interval between said first and second moving frames is narrowed.

2. A lens barrel comprising: a main body frame; a first moving frame holding a first lens group and moving in an optical axis direction with respect to the main body frame; and a second moving frame holding a second lens group, which constitutes a fixed-focus lens in combination with the first lens group, and moving in the optical axis direction with respect to the main body frame, in which said first and second moving frames are moved by a single motor in the optical axis direction with respect to said main body frame, said lens barrel further comprising:

a guide shaft for guiding a movement of both said first and second moving frames in the optical axis direction, said guide shaft being fixed on said main body frame and being extended in the optical axis direction, wherein said first moving frame has two first guide sections in which a movement in the optical axis direction is guided by said guide shaft, said two first guide sections being disposed at a predetermined interval therebetween in the optical axis direction, and said second moving frame has a second guide section in which a movement in the optical axis direction is guided by said guide shaft, said second guide section being disposed between said two first guide sections.

3. A lens barrel according to claim 2, wherein between one of said two first guide sections and said second guide section, a spring member for enabling those guide sections is disposed.

4. A lens barrel according to claim 3, wherein said first and second moving frames are moved so as to provide collapse and extension with respect to said main body frame, and at the time of the extension, said first and second moving frames move in one united body in the optical axis direction while keeping a predetermined interval therebetween by an enabling force of said spring member, and at the time of the collapse, said first and second moving frames are maintained in a state that a mutual interval between said first and second moving frames is narrowed against the enabling force of said spring member.

* * * * *